May 15, 1945.  C. GERST  2,376,136
CLUTCH STRUCTURE
Filed Nov. 16, 1943
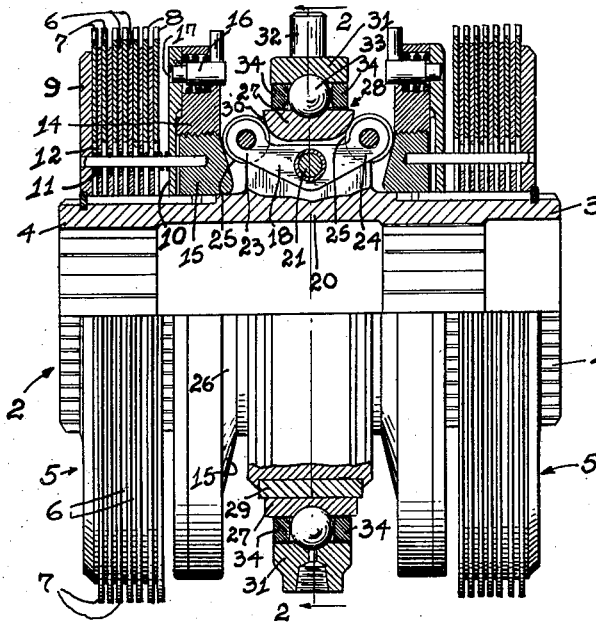
FIG·1
FIG·2
FIG·3
FIG·4
FIG·5
INVENTOR.
CHRIS GERST
BY
ATT.

Patented May 15, 1945

2,376,136

UNITED STATES PATENT OFFICE 2,376,136

CLUTCH STRUCTURE

Chris Gerst, Dearborn, Mich., assignor to Transmission Specialties Company, Detroit, Mich., a partnership Application November 16, 1943, Serial No. 510,565

1 Claim. (Cl. 192—93)

This invention relates to clutches, friction clutches etc., in which the driving position of the elements of the clutch is established by positively actuated component mechanism. Clutches of this type are generally actuated by shifting means, such as a shifting fork or similar element coupled with the component mechanism of a clutch by trunnions or shoes which ride in a circular groove of said mechanism, so that the trunnions or shoes are exposed to extensive wear and tear unless properly lubricated at all times.

The general object of the present invention is the provision of simplified shifting mechanism for clutches of the type referred to above which embodies a ball bearing, the inner race of which is constructed to form a part of the component mechanism establishing the desired driving connection and the outer race of which is constructed for direct coupling with a shifting fork.

Another object of this invention is the provision of a simplified shifting mechanism for clutches of the type referred to above which embodies a ball bearing constructed to form a part of the component mechanism by slidably and non-rotatably coupling the inner race of the ball bearing with an element of the component mechanism and forming the outer race of the ball bearing with trunnions for direct coupling with a shifting fork.

A further object of the invention is the provision of a simplified shifting mechanism for clutches of the type referred to above which embodies a ball bearing in which the outer race is formed with trunnions for directly coupling this outer race with a shifting fork and the inner race is formed as a part of the component shifting mechanism by adjustably, slidably and non-rotatably coupling this inner race with said component mechanism, so that adjustment of the position of the inner race changes the contact area through which clutching power is transferred to the friction element of the clutch structure.

Still further objects and novel features of construction, combinations and relations of parts by which the objects in view have been attained will appear and are set forth in detail in the course of the following specification. The drawing accompanying and forming part of the specification illustrates certain practical embodiments of the invention, but it will be apparent as the specification proceeds that the structure may be modified and changed in various ways without departure from the true spirit and broad scope of the invention.

In the drawing:

Fig. 1 is a sectional view, partly in elevation, of a clutch construction with a dual arrangement of clutches actuated by a shifting mechanism constructed in accordance with the invention, the section being taken on line 1—1 of Fig. 2;

Fig. 2 is a transverse sectional view through the clutch structure shown in Fig. 1, the section being taken on line 2—2 of Fig. 1;

Fig. 3 is a sectional view through the outer race member of the ball bearing forming a part of the shifting mechanism;

Fig. 4 is a sectional view through one of the spacing rings of the ball bearing; and Fig. 5 is a sectional view through the inner race member of the ball bearing.

Referring now to the exemplified form of clutch construction shown in the drawing, reference numeral 2 denotes a dual clutch structure embodying an internally and externally splined hub 3 adapted to be readily secured to a shaft (not shown), which hub mounts on its outer splined end portions 4, 4' two identically constructed multi-plate friction clutches 5, 5', so that description of the left friction clutch, as viewed in Fig. 1, will be sufficient. Thus, hub 3 mounts on its splined end portion 4 a plurality of friction driven disks 6 secured to said hub for axial, non-rotatable movement with respect thereto, and these disks cooperate with alternately disposed friction driving disks 7, with outer portions 8 adapted to be axially shiftably secured to a driving member (not shown), all as customary.

The two sets of disks 6 and 7 are forced into frictional driving engagement by a pair of clamping members, to wit: a backing plate 9 and a pressure plate 10, the former contacting the left face of the collection of disks and the latter the right face. Backing plate 9 is secured to hub 3 so as to form a fixed abutment against which friction disks 6 and 7 may be forced when shiftable pressure plate 10 is shifted to clamp the disks by a mechanism hereinafter to be described and retracted to released position by compression springs 11 which extend through openings 12 in friction plates 6 and abut against the opposed faces of plates 9 and 10.

For adjustment of the relative positions of plates 9 and 10 and compensation for wear and tear on friction disks 6 and 7, the pressure plate 10 is backed by an adjusting ring member 14 threaded upon a shiftable ring 15 which is freely shiftably and non-rotatably mounted on the splined end portion 4 of hub 3. This ring member 14, which carries a spring-pressed plunger 16 cooperating with circumferentially disposed holes 17 in pressure plate 10 to secure said ring member in its adjusted position, backs up the pressure plate 10 and controls the position of this plate with respect to the backing plate 9 without disturbing the working position of dual shifting levers 18 with respect to the shiftable ring 15.

Levers 18 which effect the actuation of the clutch disks to driving position are mounted in radial slots 19 of enlarged central hub portion 20, so as to actuate and retract the friction disks of either of the friction clutches 5, 5'. For such purpose, each lever 18 is pivotally mounted on a pin 21 which extends through wall portions 22 of central hub portion 20 and formed with oppositely extending bifurcated, symmetrically arranged arms 23, 24 mounting rollers 25 to engage the inclined end face 26 of either shiftable ring 15.

Actuation of levers 18 is effected by the inner race member 27 of a ball bearing 28, which latter forms a shifting collar for these levers. For such purpose, the ball bearing 28 has its inner race member 27 slidably and non-rotatably secured to the central portion 20 of hub 3 by means of a key 29 and has the contact faces 30 of said race member rounded for cooperation with the rollers 25. In addition, the outer race member 31 of the ball bearing 28 has extended from its outer surface a pair of oppositely arranged trunnions 32 for direct coupling with a shifting fork of common construction (not shown). The inner and outer race members of ball bearing 28 mount a plurality of steel balls 33 which are properly spaced from each other by a pair of spacer rings 34, 34' secured to each other by pins 35.

Preferably, as shown, inner race member 27 of ball bearing 28 is provided with a plurality of key slots 36 arranged so that a change of the coupling of said race member with central hub portion 20 from one of said key slots 36 to another one simultaneously changes the location of the contact area between rollers 25 and the rounded contact faces 30 of said inner race member, all for the purpose of increasing the life of the thus constructed shifting device of the clutch construction.

Having thus described my invention, what I claim is:

In a clutch structure a hub, and a component actuating mechanism for the clutch structure mounted on said hub, said mechanism including lever means pivoted to said hub, and ball bearing means shiftably coupled with said hub for relative movement with respect to said lever means, said ball bearing means having radially extended from the peripheral surface of its outer race member oppositely arranged trunnions adapted to co-operate with a shifting fork in shifting operations of said clutch structure and having its inner race member slidably keyed to said hub opposite said lever means for direct actuation of said lever means when said ball bearing means is shifted with respect to said lever means, and said inner race member having a plurality of differently spaced key slots for coupling said inner race member and hub in different angularly related positions to shift the contact area between said inner race member and said lever means.

CHRIS GERST.